(12) United States Patent
Matsumoto

(10) Patent No.: US 11,841,631 B2
(45) Date of Patent: Dec. 12, 2023

(54) IMAGE FORMING APPARATUS

(71) Applicant: CANON KABUSHIKI KAISHA, Tokyo (JP)

(72) Inventor: So Matsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 17/583,251

(22) Filed: Jan. 25, 2022

(65) Prior Publication Data

US 2022/0276602 A1  Sep. 1, 2022

(30) Foreign Application Priority Data

Mar. 1, 2021 (JP) .................. 2021-032091

(51) Int. Cl.
*G03G 15/00* (2006.01)
*H04N 1/00* (2006.01)

(52) U.S. Cl.
CPC ..... *G03G 15/6579* (2013.01); *H04N 1/00602* (2013.01); *H04N 1/00612* (2013.01); *H04N 1/00652* (2013.01)

(58) Field of Classification Search
CPC ..... G03G 15/6579; G03G 2215/00949; H04N 1/00652; H04N 1/00612; H04N 1/00602
See application file for complete search history.

(56) References Cited

U.S. PATENT DOCUMENTS

2018/0305153 A1* 10/2018 Kokubo ............... B65H 85/00
2019/0072893 A1*  3/2019 Deno .................... B65H 9/006

FOREIGN PATENT DOCUMENTS

JP  2003040479 A  *  2/2003
JP  2006-182475 A     7/2006

* cited by examiner

*Primary Examiner* — Jennifer Bahls
(74) *Attorney, Agent, or Firm* — Venable LLP

(57) ABSTRACT

An image forming apparatus includes an image forming portion, a reverse roller pair, a revering motor. A controller controls rotation of the reverse motor in a first feeding mode for the sheet with a first length and in a second feeding mode for the sheet with a second length shorter than the first length. The controller executes a first acceleration control in which the reverse motor rotating in the first rotational direction is accelerated from a predetermined speed to a first target speed faster than the predetermined speed after a rear end of the sheet passes through the image forming portion in the first feeding mode, and said controller executes a second acceleration control in which the reverse motor rotating in the first rotational direction is accelerated to a second target speed slower than the first target speed after the rear end of the sheet passes through the image forming portion in the second feeding mode.

9 Claims, 13 Drawing Sheets

IMAGE FORMING APPARATUS

FIELD OF THE INVENTION AND RELATED ART

The present invention relates to an image forming apparatus which forms an image on a sheet of recording medium.

Generally speaking, in the field of an image forming apparatus such as a printer, a facsimile, etc., there has been known such a structural arrangement that makes an image forming apparatus discharge a sheet of recording medium after placing the sheet upside down by making the sheet switch-back by a pair of reverse rollers after the formation of an image on the sheet.

Switch-backing is such a sheet conveying operation that temporarily stops a sheet of recording medium after the conveyance of the sheet in the first direction by a pair of reverse rollers, and then, conveys the sheet in the second direction, which is opposite from the first direction.

In switch-backing operation such as the one described above, it is possible that when two or more sheets of recording medium are conveyed in succession, one of consecutive conveyed two sheets which will collide with the immediately preceding sheet while the first and second sheets are conveyed in the second and first direction, respectively. As the following sheet collides with the preceding sheet, the two sheets will possibly become damaged. Thus, conventional switch-backing operation such as the one described above cannot be said to be desirable. In particular, if it is attempted to improve an image forming apparatus in productivity by reducing sheet interval during a continuous printing operation, the two sheets which are being consecutively conveyed are more likely to collide with each other.

A pair of reverse rollers begin to be accelerated to a target speed, which is faster than an image formation speed, with a preset timing, which they are conveying a sheet of recording medium in the first direction (forward rotation). Then, they are temporarily stopped to start conveying the sheet in the second direction (reverse direction). Then, as they begin to be rotated in the second direction, they are accelerated to the same speed as the aforementioned target speed. Then, they are driven at the target speed until the trailing end of the sheet passes through the nip of the pair of reverse rollers. That is, a sheet of recording medium is accelerated to the target speed by the pair of reverse rollers to reduce an image forming apparatus in the collision which occurs between two sheets of recording medium which are being consecutively conveyed.

The reverse rollers described in Japanese Laid-open Patent Application 2006-182475 described above are driven by the forward or reverse rotation of a motor. In order to prevent the problem that a motor tends malfunction when it is switched in rotational direction between the forward and reverse directions, it is necessary to keep the motor stationary for a preset length of time between the period in which it is rotated forward and one in which it is rotated in reverse. However, in a case were an image forming apparatus is structured so that the pair of its reverse rollers are accelerated to a target speed as described in Japanese Laid-open Patent Application No. 2006-182475, it takes an additional length of time to accelerate or decelerate its motor, making it necessary to increase the apparatus in the length of time it is kept stationary, which in turn possibly reduces the apparatus in productivity.

Further, in recent years, there have been desired image forming apparatuses which are high in productivity, and yet can form an image on any of various sheets of recording medium which are different in length. The requirements for preventing two sheets of recording medium which are being conveyed in succession from colliding with each other, and the requirement for providing an image forming apparatus with a sufficient length of time for allowing the apparatus to remain stationary, are affected by sheet length.

SUMMARY OF THE INVENTION

Thus, the primary object of the present invention is to provide an image forming apparatus which is capable of keeping a pair of its reverse rollers stationary for a sufficient length of time to prevent two sheets of recording medium which are being conveyed in succession from being damaged, regardless of sheet length, and yet, is satisfactorily high in productivity.

According to an aspect of the present invention, there is provided an image forming apparatus comprising an image forming portion configured to form an image on a sheet; a reverse roller pair, in order to switch back the sheet on which the image is formed by said image forming portion, configured to feed the sheet in a first direction and then to reverse and feed the sheet in a second direction opposite to the first direction; a revering motor configured to rotate in a first rotational direction and cause said reverse roller pair to feed the sheet in the first direction, and to rotate in a second rotational direction opposite to the first rotational direction and cause said reverse roller pair to feed the sheet in the second direction; and a controller configured to control rotation of said reverse motor in a first feeding mode in which the sheet with a first length is fed and in a second feeding mode in which the sheet with a second length shorter than the first length is fed, wherein said controller executes a first acceleration control in which said reverse motor rotating in the first rotational direction is accelerated from a predetermined speed to a first target speed faster than the predetermined speed after a rear end of the sheet passes through said image forming portion in the first feeding mode, and said controller executes a second acceleration control in which said reverse motor rotating in the first rotational direction is accelerated to a second target speed slower than the first target speed after the rear end of the sheet passes through said image forming portion in the second feeding mode.

Further features of the present invention will become apparent from the following description of exemplary embodiments (with reference to the attached drawings).

DESCRIPTION OF THE EMBODIMENTS

Embodiment 1

[General Structure]

To begin with, the first embodiment of the present invention is described. Printer 1 is an image forming apparatus. It is a full-color laser beam printer. It is of an electrophotographic type. Further, it is of the so-called intermediary transfer type, and also, of the tandem type.

Unlike an image forming apparatus of the so-called direct transfer type, an image forming apparatus of the intermediary-tandem type does not need to hold a sheet of recording medium, on a transfer drum, a transfer belt, or the like. Therefore, it can deal with many types of transfer medium such as a substantially thick sheet of paper and a sheet of coated paper. Further, one of its specific features is that multiple images are simultaneously processible in its multiple image forming sections, one for one, and also, multiple monochromatic images which are different in color, and, of which a full-color image is made up, is transferred all at once. Therefore, it is ideal from the standpoint of high productivity.

Figure 1:
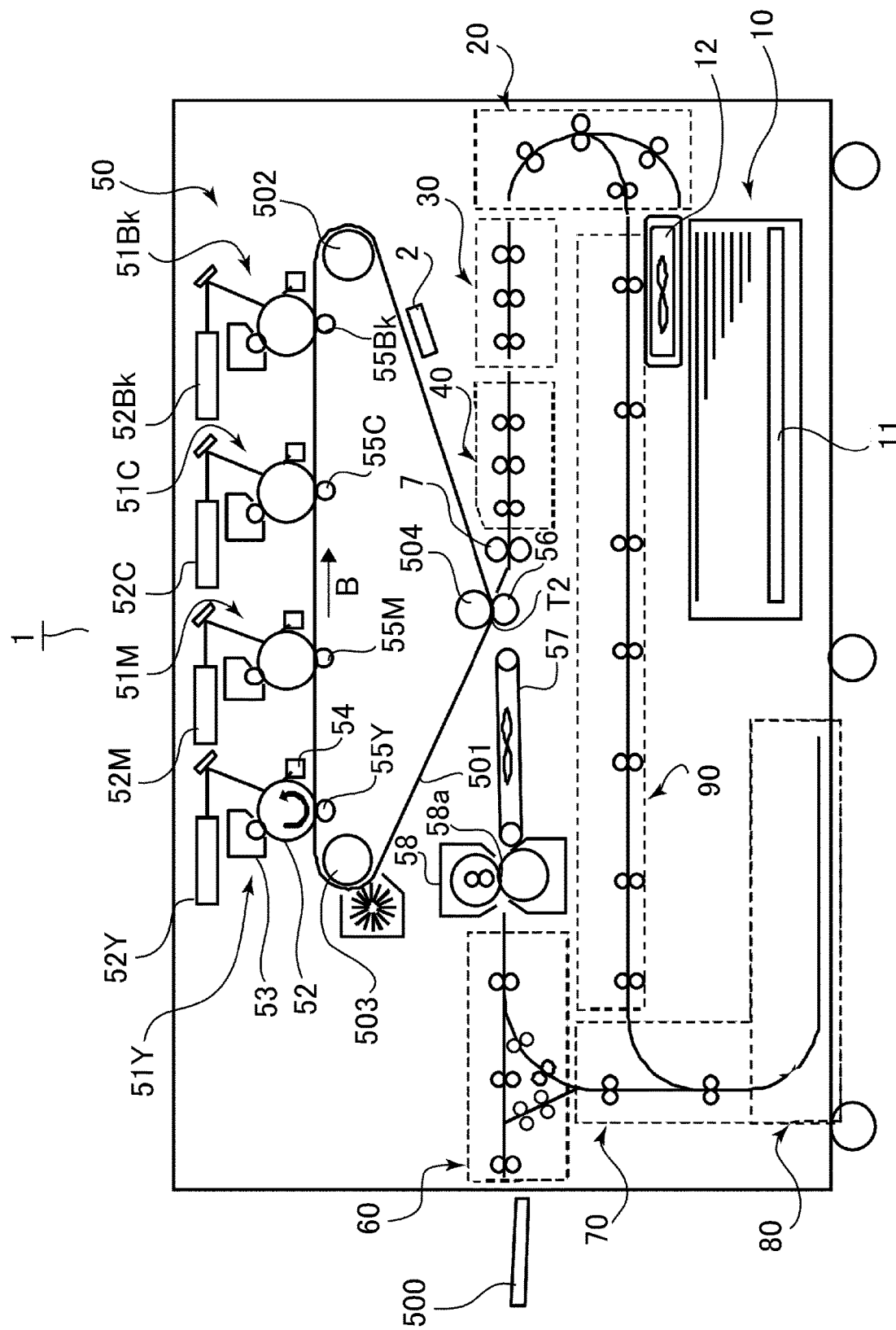
FIG. 1 is a schematic sectional view of the printer in the first embodiment of the present invention.

Referring to FIG. 1, the printer 1 has a feed unit 10, an extraction unit 20, conveyance units 30 and 40, an image formation unit 50, a fixing device 58, and a branching conveyance unit 60. It has also a reverse conveyance unit 70, a reverse draw unit 80, and a two-sided mode conveyance unit 90.

The image formation unit 50 is equipped with: four process cartridges 51Y, 51M, 51C and 51Bk, which form four monochromatic toner images which are different in color, more specifically, yellow (Y), magenta (M), cyan (C) and black (K) toner images; and four exposing apparatuses 52Y, 52M, 52C and 52Bk. By the way, the four process cartridges 51Y, 51M, 51C and 51Bk are the same in structure, although they are different in the color of the image they form. Therefore, only process cartridge 51Y will be described about its structure and image formation process; the process cartridges 51M, 51C and 51Bk are not described.

The process cartridge 51Y has a photosensitive drum 52, a charge roller, a development device 53, and a cleaner 54. The photosensitive drum 52 is made by coating the peripheral surface of a piece of aluminum cylinder, with a layer of an organic photoconductive substance. It is rotated by a motor. The image formation unit 50 is equipped with an intermediary transfer belt 501 which is circularly driven by a motor in the direction indicated by an arrow mark B. The intermediary transfer belt 501 is suspended by a combination of a tension roller 502, a driver roller 503, and a secondary transfer inside roller 504, which are positioned on the inward side of a loop (belt loop) which the intermediary transfer belt 501 forms. On the inward side of the loop which the intermediary transfer belt 501 forms, the primary transfer rollers 55Y, 55M, 55C and 55Bk are disposed. On the outward side of the belt loop, the second transfer outside roller 56 is disposed in a manner to oppose the secondary transfer inside roller 504.

The fixing device 58 has a fixation nip 58a, through which a sheet of recording medium is conveyed while remaining pinched between the two rollers of the fixing device 58. The feed unit 10 has: a lift plate 11 which moves up or down while holding sheets of recording medium in layers; and a feeding section 12 which feeds the sheets on the lift plate 11, into the main assembly of the printer 1. In this embodiment, the feeding section 12 employs as air conveying method, which feeds sheets of recording medium, one by one, into the main assembly of the printer 1, by pneumatically separating (suctioning) the sheets. However, this embodiment is not intended to limit the present invention in scope. For example, the present invention is also compatible with a feed section of the roller conveyance type, which feeds a sheet of recording medium into the main assembly with the use of a pick-up roller or the like, and a feed section of the electrostatic attraction type, which feeds a sheet of recording medium into the main assembly of the printer 1 with the use of electrostatic force.

Next, the image forming operation which is carried out by the printer 1 structured as described above is described. As image formation signals are inputted into the exposing apparatus 52Y from a personal computer or the like, a beam of laser light is projected onto the peripheral surface of the photosensitive drum 52 of the process cartridge 51Y, while being modulated with the image formation signals.

Prior to the projection of the beam of laser light upon the photosensitive drum 52, the peripheral surface of the photosensitive drum 52 has been uniformly charged by the charge roller to preset polarity and potential level. Thus, as the beam of laser is projected onto the peripheral surface of the photosensitive drum 52 from the exposing apparatus 52y, by way of mirrors, an electrostatic latent image is formed on the peripheral surface of the photosensitive drum 52. This electrostatic image on the photosensitive drum 52 is developed by the development device 53 into an yellow (Y) toner image; a yellow (Y) toner image is formed on the peripheral surface of the photosensitive drum 52.

In the same manner, a beam of laser light is projected upon the photosensitive drum of each of the process cartridges 51M, 51C and 51Bk, from the exposing apparatuses 52M, 52C and 52Bk, forming magenta (M), cyan (C) and black (K) toner images on the photosensitive drums, one for one. After the formation of the toner images on the photosensitive drums, the toner images are transferred onto the intermediary transfer belt 501 by the primary transfer rollers 55Y, 55M, 55C and 55Bk, yielding a full-color toner image on the intermediary transfer belt 501. Then, the full-color toner image is conveyed by the intermediary transfer belt 501, which is rotated by the motor 503, to the secondary transfer nip T2, which is formed by the secondary transfer inside roller 504 and secondary transfer outside roller 56. The toner which is remaining on the photosensitive drum 52 is recovered by cleaner 54. By the way, the image formation processes for forming four monochromatic toner images, which are different in color, are carried out with such timing that the downstream monochromatic toner images will be layered upon the upstream toner images.

In synchronism with the progression of the image formation processes, a sheet S of recording medium is fed into the main assembly of the printer 1 from the sheet feeder unit 10, and then, is conveyed to a pair of registration rollers 71 by the registration unit 40. In a case where the sheet S happens to be conveyed askew, it is corrected in attitude by the registration unit 40. Then, the sheet is conveyed to the secondary transfer nip T2 with preset conveyance timing. The full-color toner image on the intermediary transfer belt 501 is transferred onto the first surface (top surface) of the sheet S by the secondary transfer bias applied to the secondary transfer outside roller 56. The toner which is remaining on the intermediary transfer belt 501 is recovered by a belt cleaner 2.

After the transfer of a toner image onto a sheet S of recording medium, the sheet S is conveyed to the fixing device 58 by a pre-fixation sheet conveyance section 57. Then, the sheet S is guided to the fixation nip 58a of the fixing device 58, in which a combination of a preset amount of heat and a preset amount of pressure is applied to the sheet S and the toner image thereon. Consequently, the toner image becomes fixed to the sheet S. That is, the toner image is melted, and then, it becomes permanently adhered to the sheet S as it cools down. After being conveyed through the fixing device 58, the sheet S is conveyed by the branching conveyance unit 60 either to a discharge tray 500 or a reverse conveyance unit 70. By the way, the branching conveyance unit 60 can be utilized to carry out the so-called face-down conveyance sequence, that is, a sequence to flip the sheet S upside-down so that the first surface of the sheet S, that is, the surface of the sheet S, on which an image has just been transferred in the secondary transfer nip T2, faces downward as it is discharged into the discharge tray 500.

In a case where an image is formed on only one of the two surfaces of a sheet S of recording medium, the sheet S is conveyed to the discharge tray 500 from the branching conveyance unit 60. In a case where an image is formed on both surfaces of the sheet S, the sheet S is conveyed to the reverse conveyance unit 70 by the branching conveyance unit 60, and is drawn into the reverse draw unit 80. Then, it is switch-backed by the combination of the reverse conveyance unit 70 and reverse draw unit 80. After being switch-backed, the sheet S is conveyed to the two-sided mode conveyance unit 90 from the reverse conveyance unit 70. Then, it is guided to a draw unit 20. Thereafter, an image is formed on the second surface (back surface) of the sheet S in the secondary transfer nip T2. Then, it is discharged into the discharge tray 500.

[Structure of Branching Conveyance Unit and Structure of Reverse Conveyance Unit]

Figure 2:
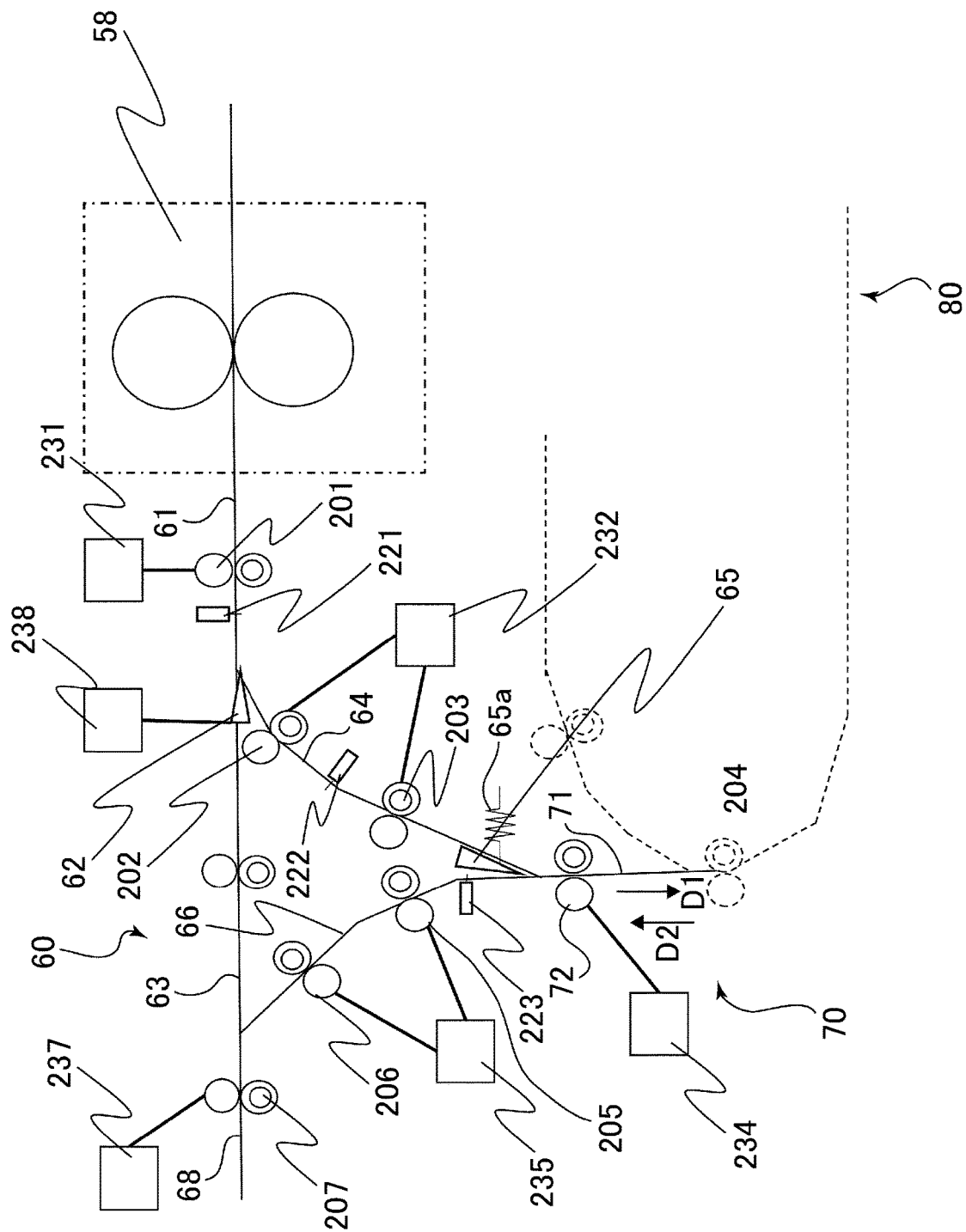
FIG. 2 is a schematic drawing of a combination of the branching conveyance unit and reverse conveyance unit.

Next, the branching conveyance unit 60 and the reverse conveyance unit 70 are described about their structure. Referring to FIG. 2, the branching conveyance unit 60 has: an entrance conveyance passage 61 which guides a sheet S of recording medium as the sheet S is conveyed thereto by the fixing device 58; a straight conveyance passage 63 which extends straight from the entrance conveyance passage 61. Further, the branching conveyance unit 60 has: a reverse merge passage which extends straight from the straight conveyance passage 63; and a reverse pre-conveyance passage 64 which branches away from the downstream end of the entrance conveyance passage 61, in terms of the sheet conveyance direction, in the different direction from the straight conveyance passage 63. Moreover, the branching conveyance unit 60 has: a reverse conveyance passage 71 which extends downward from the reverse pre-conveyance passage 64; and a reverse post-conveyance passage 66 which connects the Reverse conveyance passage 71 with a reverse merge passage 68.

The point of branch between the straight conveyance passage 63 and the reverse pre-conveyance passage 64 is provided with a first switching member 62, which is switchable in position between the one in which it guides a sheet S of recording medium into the straight conveyance passage 63 and the one in which it guides the sheet S into the reverse pre-conveyance passage 64 as the sheet comes out of the entrance conveyance passage 61. The first switching member 62 is driven by switching motor 238.

The point of branch between the reverse pre-conveyance passage 64 and the reverse post-conveyance passage 66 is provided with a second switching member 65, which is kept by a pressing member 65a, in a position in which it guides the sheet S into the reverse post-conveyance passage 66 as the sheet S comes through the entrance conveyance passage 61. In a case where the sheet S is conveyed into the reverse pre-conveyance passage 64 from the entrance conveyance passage 61, the sheet S advances into the entrance conveyance passage 61 against the pressure from the pressing member 65a, while pressing the second switching member 65.

The entrance conveyance passage 61 is provided with a pair of first draw rollers 201, which are driven by a first draw motor 231, and a first detection section 221 positioned on the downstream side of the first draw rollers 201 in terms of the sheet conveyance direction. The reverse pre-conveyance passage 64 is provided with a pair of second draw rollers and pair of third draw rollers 203, which are driven by a second draw motor 232, and a second detection section 222 which is positioned between the pair of the second draw rollers 202, and the pair of third draw rollers 203.

The reverse conveyance passage 71 is provided with a pair of reverse rollers 71, which are capable of rotating backward as well as forward, and also, are capable of switch-backing the sheet S. The pair of reverse rollers 72 are driven by a reverse motor 234. The reverse post conveyance passage 66 is provided with a pair of conveyance rollers 205 and a pair of conveyance rollers 206, which convey the sheet S toward the reverse merge passage 68. These pairs of conveyance rollers 205 and 206 are driven by a conveyance motor 235. Further, the reverse post-conveyance passage 66 is provided with third detection section 223, which is positioned between the pair of conveyance rollers 205 and pair of conveyance rollers 206, in terms of the sheet conveyance direction. The reverse merge passage 68 is provided with a pair of discharge rollers 207, which are driven by a discharge motor 237. First, second, and third detection sections 221, 222, and 223 detect the sheet S at their point of detection.

[Control Sequence]

Figure 3:
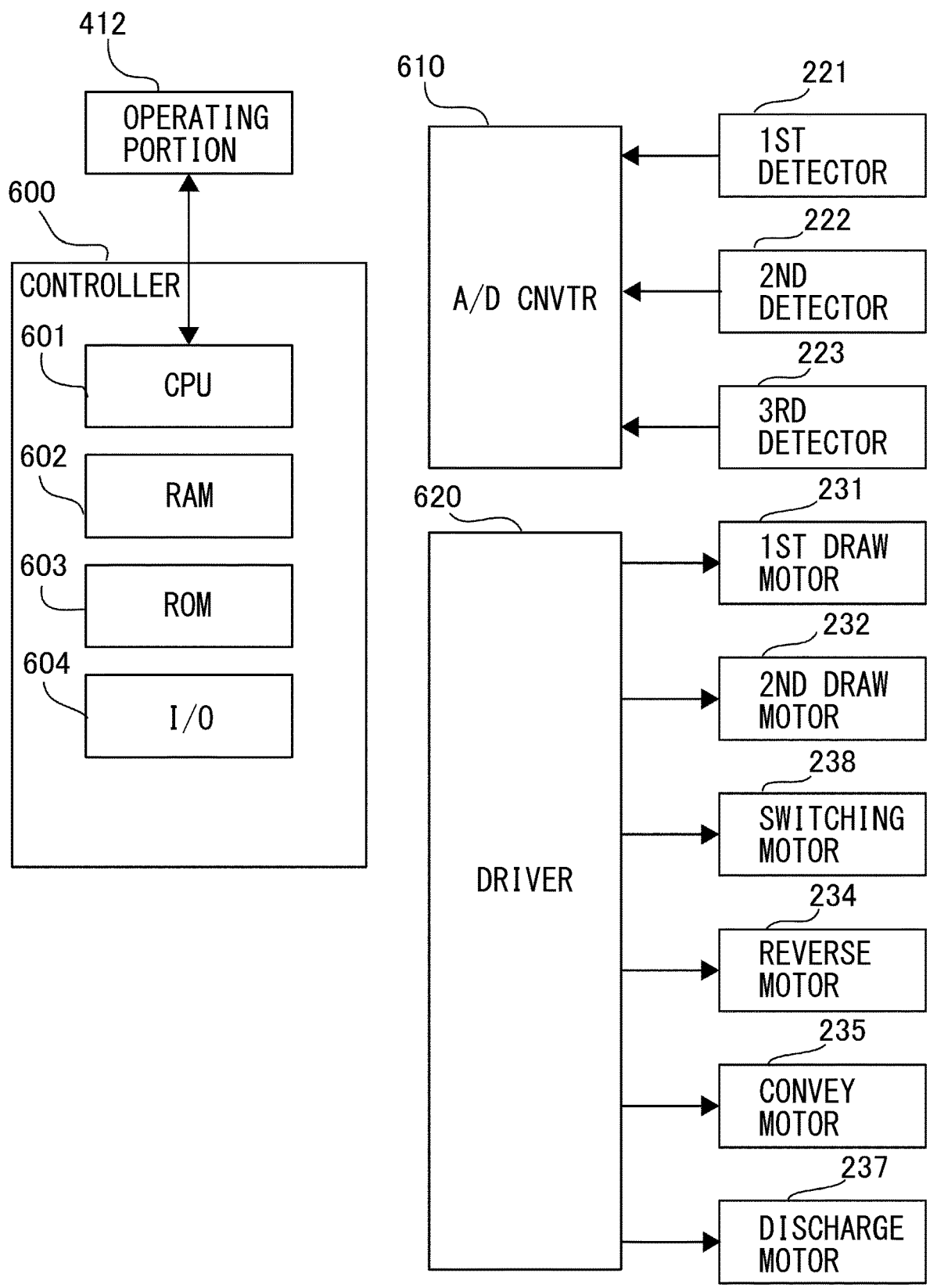
FIG. 3 is a block diagram of the control sequence.

FIG. 3 is a block diagram of the control sequence of the printer 1. Referring to FIG. 3, the printer 1 has a control section 600, which has CPU 601, RAM 602, and ROM 603. The control section 600 reads out various programs from ROM 603, and carries out these programs. RAM 602 is used as a work area for CPU 601. The control section 600 is connectible to external PCs and other devices by way of I/O 604.

CPU 601 is in connection to a control portion 412 which has a control panel, etc. A user can issue such commands as changing the printer 1 in various operational settings, starting of a print job, etc. CPU 601 is in connection to the first, second, and third detection sections 221, 222, and 223 by way of A/D conversion section 610. Further, CPU 601 is in connection to the first draw motor 231, the second draw motor 232, s238, the reverse motor 234, the conveyance motor 235, and the discharge motor 237, by way of driver 620.

[Control of Reverse Motor]

Next, the control of the reverse motor 234 which controls the operation of the pair of reverse rollers 72 for making a sheet S of recording medium switch-back is described. First, CPU 601 rotates the reverse motor 234 forward, that is, the first rotational direction, to make the printer 1 carry out the switch-back operation with the use of the pair of reverse rollers 72. Thus, the sheet S is conveyed by the pair of reverse rollers 72 in the first direction D1 as shown in FIG. 2. Then, CPU 601 stops the reverse motor 234 to temporarily stop the pair of reverse rollers 72. Then, CPU 601 makes the reverse motor 234 rotate backward, that is, the second rotational direction D1 which is opposite in the direction from the first rotational direction, to convey the sheet S in the second direction D2, that is, the opposite direction from the first direction D1, with the use of the pair of reverse rollers 72.

As described above, in order to ensure that no operational error occurs to the reverse motor 234 when the reverse motor 234 is changed in the rotational direction between forward and backward, it is necessary to provide the reverse motor 234 with a preset length of time for stopping driving the pair of reverse rollers 72. Unless it is ensured that the preset length of time is provided for stopping the reverse motor 234, problems occur to the operation of the reverse motor 234, that is, the reverse motor 234 erroneously operates. In addition, in order to change the reverse motor 234 in speed, that is, to start it up, and stops it, the reverse motor 234 has to be provided with the time for acceleration, and the time for deceleration. Unless the reverse motor 234 is provided with a sufficient length of time for these operations, the reverse motor 234 ends up erratically operating, as it is stopped.

Moreover, in order to prevent the problem that when two sheets S of recording medium are conveyed in succession, the preceding sheet S and following sheet S collide with each other during a switch-backing operation, it is desired that the switch-backing of the preceding sheet S is completed as soon as possible. Thus, such a control is carried out that finishes accelerating the sheet S as soon as possible to finish the switch-backing of the sheet S. However, from the standpoint of image quality, it is difficult (undesirable) to make an image forming section 50, which is an image forming section, convey the sheet S at a high speed. Therefore, the desirable timing with which the reverse motor 234 is made to accelerate is immediately after the trailing end of the sheet S comes out of the image forming section 50.

The printer 1 in this embodiment is capable of forming an image on various sheets of recording medium, which are different in length. Thus, the longer the sheet S is, more likely it is for the reverse motor 234 to begins to be accelerated while the leading edge of the sheet S is on the downstream side of the pair of reverse rollers 72. For example, in a case where a sheet S of recording medium which has the first length (which hereafter will be referred to as long sheet) is in use, the reverse motor 234 begins to be accelerated when the leading edge of the sheet is in the first position. In a case where a sheet of recording medium which has the second length, which is shorter than the first length (which hereafter will be referred to as short sheet) is in use, the reverse motor 234 begins to be accelerated when the leading edge of the sheet is in the second position, which is on the upstream side of the first position in terms of the sheet conveyance direction. Thus, with reference to the leading edge of the sheet S, the point at which the sheet S is to begin be accelerated is affected by the size of the sheet S.

Further, in the case of this embodiment, the image forming section 50 includes the fixing device 58, and the reverse motor 234 can be accelerated from a process speed Vp after the trailing end of the sheet S comes out of the nip 58a of the fixing device 58. The process speed Vp, which is a preset speed, is an image formation speed, which corresponds to the speed at which the sheet S is conveyed through the secondary transfer nip T2. By the way, in this embodiment, the printer 1 is set so that the reverse motor 234 begins to be accelerated as the trailing edge of the sheet S advances by a distance C after it comes out of the fixation nip 58a. The value for distance C is set in consideration of the variations in sheet length, inconsistency in the sheet detection by the sheet detection sensors. It is a margin for ensuring that the trailing end of the sheet S comes out of the fixation nip 58a before the reverse motor 234 begins to be rotated.

In this embodiment, the length of the image forming section 50, that is, the distance between the fixation nip 58a and the nip of the pair of reverse rollers 72, is shorter than the length of the longest sheet conveyable through the printer 1 according to the printer specifications. To describe in greater detail, the distance between the fixation nip 58a and the nip of the pair of reverse rollers 72 is shorter than the length (first length) of the aforementioned long sheet, and longer than the length (second length) of the aforementioned short sheet.

Therefore, in a case where a long sheet S of recording medium is conveyed, when the pair of reverse rollers 72 receive the sheet S, this sheet S remains pinched by the fixation nip 58a. Therefore, when the pair of reverse rollers 72 receive a long sheet S of recording medium, speed Vf1 of the reverse motor 234 is equal to process speed Vp (Vf1=Vp). Then, the reverse motor 234 is accelerated to first target speed Va1 from process speed Vp after the trailing edge of the long sheet comes out of the fixation nip 58a, and is conveyed by distance C (Vf1=Vp<Va1).

On the other hand, in a case where a short sheet is conveyed, when the pair of reverse rollers 72 receive the sheet S, the trailing edge of the sheet S will have come out of the fixation nip 58a. Therefore, the speed Vf2 of the reverse motor 234 when the pair of reverse rollers 72 receive the sheet S can be set to second target speed Va2, which is greater than process speed Vp (Vf2=Va2>Vp).

By the way, hereafter, for the sake of descriptive simplification, it is assumed that the speed of the reverse motor 234 is the same as that at which the sheet S is conveyed. For example, it is assumed that the sheet conveyance speed when the reverse motor 234 is driven at first target speed Va1 is the same as first target speed Va1. That is, it is assumed that the speed of each motor is equal to the peripheral velocity of each roller which is driven by the corresponding motor.

Figure 4A:
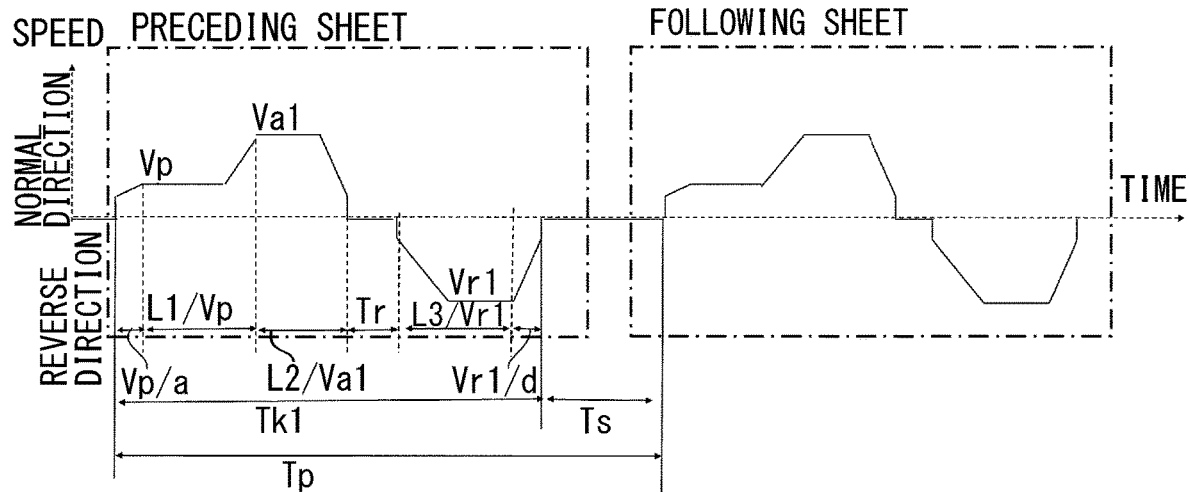
FIG. 4A is a line graph which represents the first driving sequence.
Figure 4B:
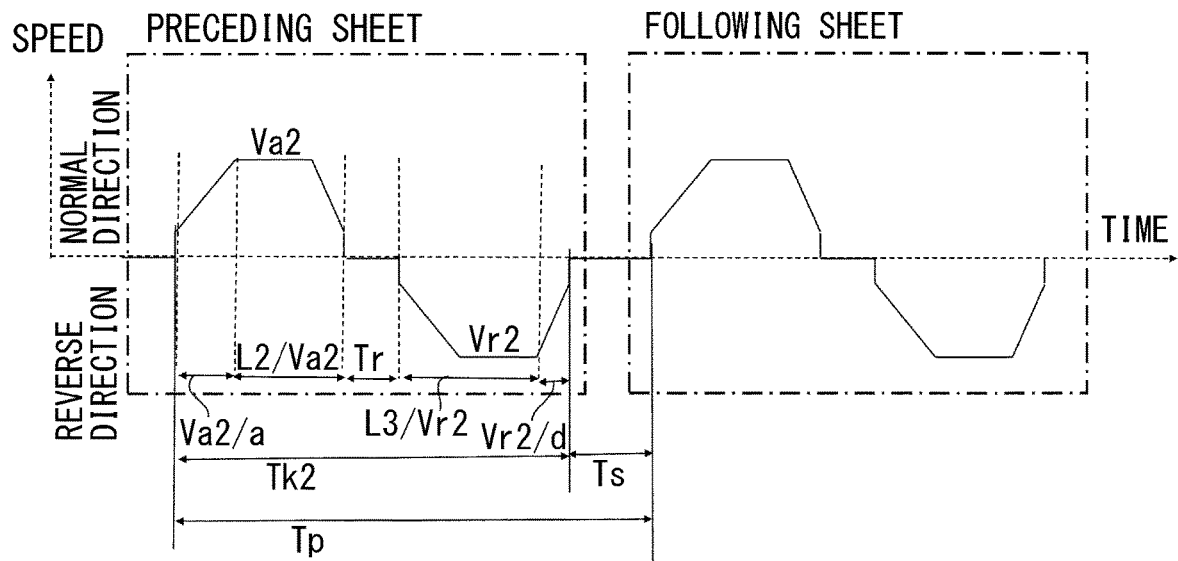
FIG. 4B is a line graph which represents the second driving sequence.

In this embodiment, the speed at which the reverse motor 234 is driven to convey a long sheet is represented by the line (first line) in FIG. 4A, and the speed at which the reverse motor 234 is driven to convey a short sheet is represented by the line (second line) in FIG. 4B. Referring to FIG. 4A, in a case a long sheet is conveyed, the reverse motor 234 is accelerated to process speed Vp (=Vf1) for the reception of the sheet, and is driven at this speed for a preset length of time. Then, it is accelerated to first target speed Va1 after the trailing edge of the long sheet comes out of the fixation nip 58a, and is conveyed further by distance C. Then, it is driven at first target speed Va1 for a preset length of time.

Thereafter, the reverse motor 234 is decelerated to enable the reverse motor 234 to be changed in rotational direction with such timing that the trailing edge of the long sheet passes by the second switching member 65. Then, it is kept stationary for a preset length of time Tr. Then, it begins to be rotated backward, and is accelerated to first discharge speed Vr1. Then, the reverse motor 234 is stopped as soon as the trailing edge of the long sheet comes out of the nip of the pair of reverse rollers 72.

Next, referring to FIG. 4B, in a case where a short sheet is conveyed, the reverse motor 234 is accelerated to second target speed Va2 (>Vp) to receive the sheet. After the reception of the sheet by the pair of reverse rollers 72, the reverse motor 234 is rotated at second target speed Va2 for a preset length of time.

Thereafter, the reverse motor 234 is decelerated to be enabled to be changed in direction with such timing that the trailing edge of the short sheet passes by the second switching member 65. Then, the reverse motor 234 is kept stationary for a preset length Tr of time. Then, it begins to be driven in reverse, and is accelerated to second discharge speed Vr2. Then, the reverse motor 234 is stopped as the trailing edge of the short sheet comes out of the nip of the pair of reverse rollers 72.

[Feasibility of Recording Medium Conveyance]

The values to which first and second target speeds Va1 and Va2, and first and second discharge speeds Vr1 and Vr2 are to be set are discussed from the standpoint of the feasibility of the recording medium conveyance in accordance with the present invention.

Setting the printer 1 for productivity determines the length of time Tp which is affordable to switch-back a single sheet of recording medium. The length of time Tp includes the length of time Tk (which includes length of time Tr when the reverse motor 234 is kept stationary) when the reverse motor 234 is driven to switch-back a single sheet of recording medium, and length of time Ts for allowing the reverse motor 234 to rest for the next sheet. From the standpoint of affording the reverse motor 234 a sufficient length of rest time Ts, it is desired that the length of time Tk is as short as possible.

Hereafter, the length of time Tk for a long sheet is referred to as time Tk1, and the length of time Tk for a short sheet is referred to as time Tk2. Next, referring to FIGS. 5A and 5B, time Tk1 and time Tk2 were analyzed and simplified to be expressed in the form of the following mathematical formulas (1) and (2), respectively. By the way, for simplification, the length of time when the reverse motor 234 is accelerated from the low speed (Vp) to the high speed (Va1) is included in the length of time of low speed conveyance time, and the length of time when the reverse motor 234 is accelerated for discharging is included in the length of time for discharging.

$$Tk1 = \text{(length of time for acceleration)} + \text{(length of time for low speed conveyance)} + \text{(length time for high speed conveyance)} + \text{(length of time for changing the reverse motor 234 in direction)} + \text{(length of time for discharging)} + \text{(length of time for deceleration)} = (Vp/a) + (L1/Va1) + (L2/Va1) + (Tr) + (L3/Vr1) + (Vr1/d) \quad (1)$$

$$Tk2 = \text{(length of time for acceleration)} + \text{(length of time for high speed conveyance)} + \text{(length of time for changing the reverse motor 234 in direction)} + \text{(length of time for discharging)} + \text{(length of time for deceleration)} = (Va2/a) + (L2/Va2) + (Tr) + (L3/Vr2) + (Vr2/d) \quad (2)$$

Vp: process speed
a: acceleration speed
d: deceleration speed
L1: low speed conveyance distance
L2: high speed conveyance distance
L3: discharge conveyance distance
Va1: first target speed
Va2: second target speed
Vr1: first discharge speed
Vr2: second discharge speed
Tr: length of rest time Here, acceleration a, deceleration d, and length of time Tr are such constants that are determined by a constant related to the performance of the reverse motor 234, and L1-L3 are constants determined by sheet length. Process speed Vp is a constant determined by image formation requirements. Therefore, they are not treated as variables. That is, as variable parameters, first target speed Va1, second target speed Va2, first discharge speed Vr1, and second discharge speed Vr2 can be listed.

Figure 5A:
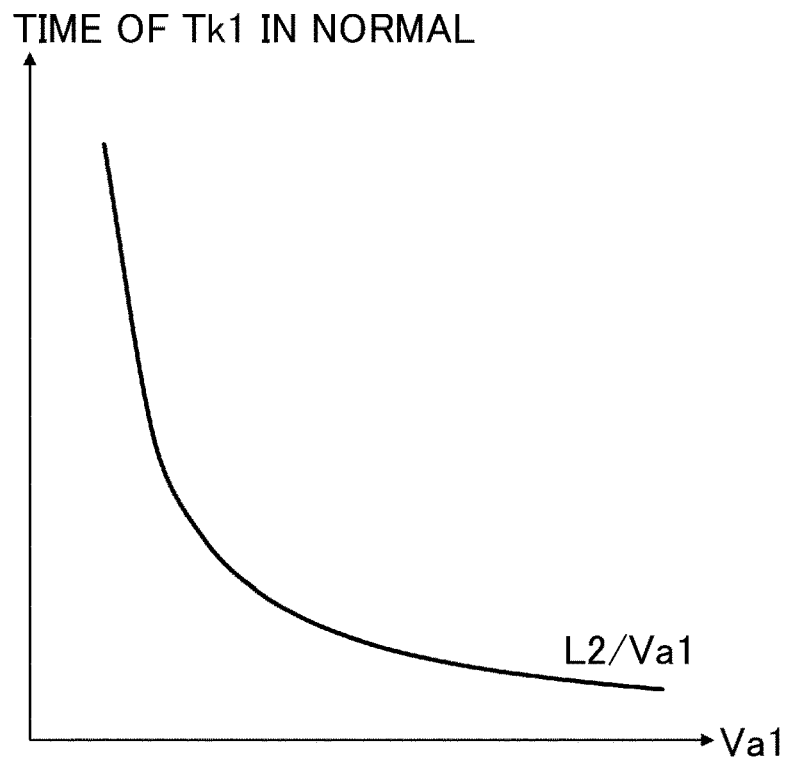
FIG. 5A is a line graph which show the length of time the reverse motor is driven forward in the first driving sequence.

First, regarding length of time Tk1, attention is paid to first target speed Va1. It is assumed that first discharge speed Vr1 is constant. Then, length of time Tk1 has term (L2/Va1), which is inversely proportional to first target speed Va1, and other terms may be deemed to be constants. Then, the term (L2/Va1) which is inversely proportional to first target speed Va1 can be expressed as shown in FIG. 5A, in which the horizontal axis represents Va1, whereas the vertical axis represents Tk1. That is, length of time Tk1 is inversely proportional to first target speed Va1.

Figure 5B:
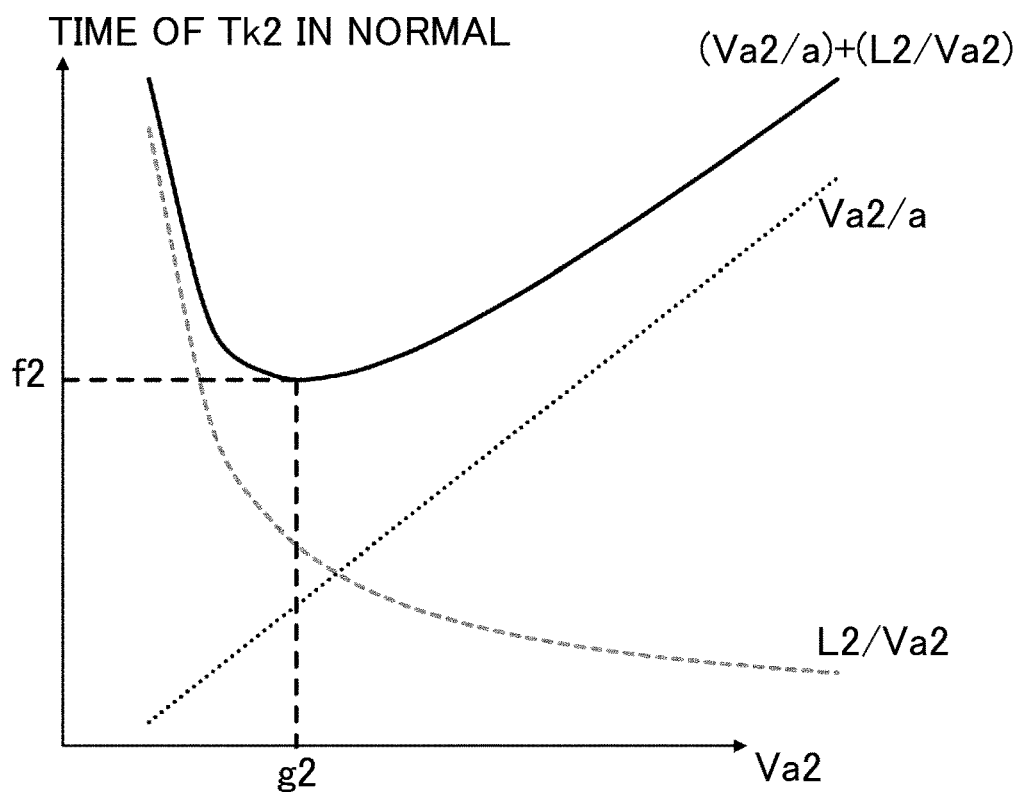
FIG. 5B is a graph which shows the length of time the reverse motor is driven forward in the second driving sequence.

Next, regarding length of time Tk1, let's pay attention to second target speed Va2, and assume that the second discharge speed Vr2 is constant. Then, length of time Tk2 has a term (Va2/a) which is proportional to length of time Tk2, and a term (L2/Va2) which is inversely proportional to second target speed Va2, and other terms may be deemed to be constants. Thus, (Va2/a)+(L2/Va2) can be expressed as shown in FIG. 5B, in which the horizontal and vertical axes represent Va2 and Tk2, respectively. That is, length of time Tk2 is inversely proportional to second target speed Va2, taking the smallest value (f2) when Va2=g2. As for length of time Tk2, as second target speed Va2 is increased beyond a value g2, it gradually increases.

Therefore, length of time Tk1 for conveying a long sheet is inversely proportional to first target speed Va1, but length of time Tk2 for conveying a short sheet increases if second target speed Va2 is excessively increased. In this embodiment, therefore, first target speed Va1 is set to be larger than second target speed Va2 (Va1>Va2).

Therefore, length of time Tk1 becomes shorter, making it possible to improve the printer 1 in terms of productivity when long sheets are conveyed. Further, as described above, in terms of sheet conveyance direction, the point at which the printer 1 is increased in conveyance speed when a long sheet is used is on the downstream side of the point at which the printer 1 is increased in conveyance speed when a short sheet is in use. However, first target speed Va1 is faster than second target speed Va2. Therefore, it is possible to prevent consecutively conveyed two sheets from colliding with each other. That is, the printer 1 can be reduced in sheet damage.

Setting first target speed Va1 to a high value makes it necessary to increase the reverse motor 234 in the length of time for accelerating them to first target speed Va1, and the length of time for decelerating the reverse motor 234 from first target speed Va1. However, when the pair of reverse rollers 72 receives a long sheet, the reverse motor 234 is rotating at process speed Vp. Therefore, the effect of setting first target speed Va1 to a high value upon length of rest time Tr and length of no rotation time Ts is small, making it possible to sufficiently provide the reverse motor 234 with resting time Tr and stop time Ts. Therefore, it is possible to prevent the reverse motor 234 from malfunctioning.

On the other hand, when the pair of reverse rollers 72 receives a short sheet, the reverse motor 234 has been accelerated to second target speed Va2 which is faster than process speed Vp. Therefore, setting second target speed Va2 to a high value like first target speed Va1 affects the length of rest time r and that of stop time Ts. Thus, by setting second target speed Va2 to be slower than first target speed Va1, it is possible to provide the reverse motor 234 with sufficient of rest time Ts, making it possible to reduce the reverse motor 234 in malfunction. Further, the pair of reverse rollers 72 receive a short sheet after the reverse motor 234 has been increased in speed from second target speed Va2 which is faster than process speed Vp. Therefore, it is possible to increase the printer 1 in productivity.

Next, it is assumed that first discharge speed Vr1 and second discharge speed Vr2 are constant. Time Tk1 has term (L3/Vr1) which is inversely proportional to first discharge speed Vr1, and term (Vr1/d) which is proportional to first discharge speed Vr1, and other terms may be deemed constant. Similarly, time Tk2 has term (L3/Vr2) which is inversely proportional to second discharge speed Vr2, and a term (Vr2/d) which is proportional to second discharge speed Vr2, and other terms may be deemed constant.

Figure 6:
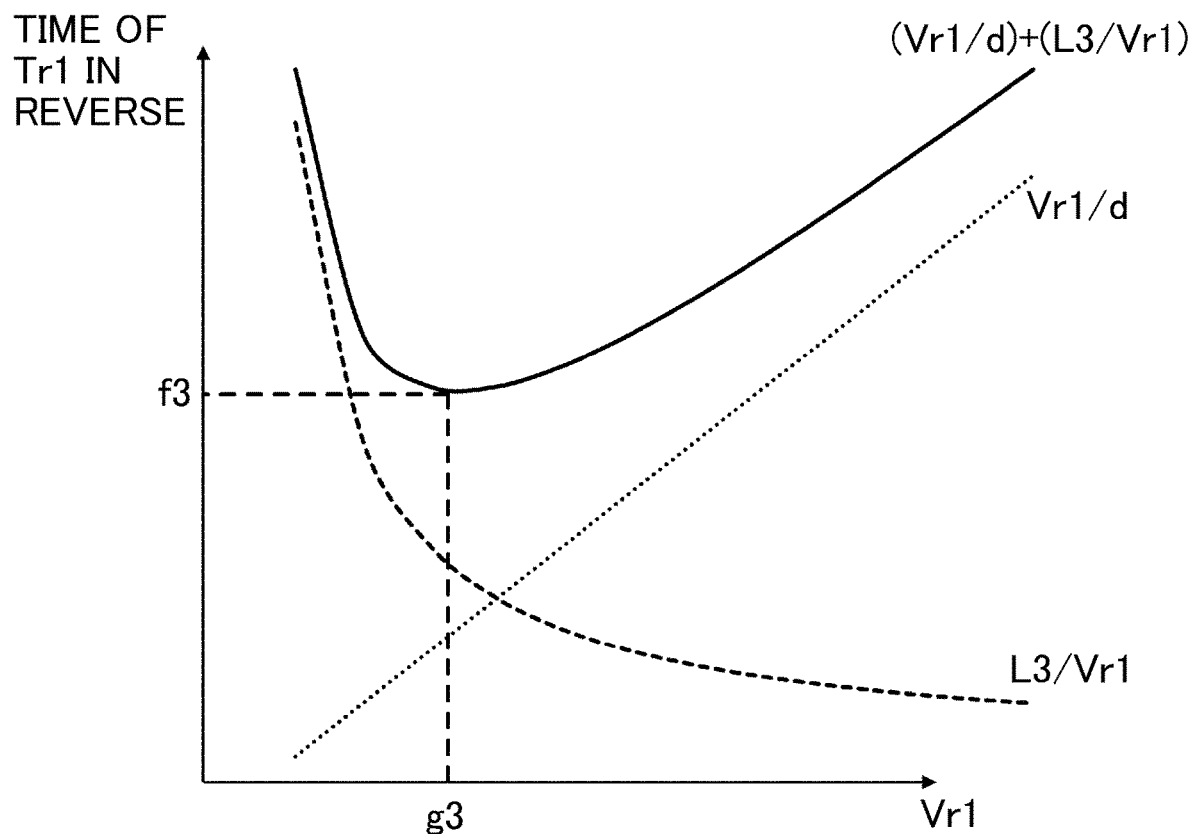
FIG. 6 is a graph which shows the length of time the reverse motor is driven in reverse in the first driving sequence.

(L3/Vr1)+(Vr1/d) may be expressed as shown in FIG. 6, in which the horizontal axis represents Va1, and the vertical axis represents Tk1. That is, as first discharge speed Vr1 is increased, time Tk1 gradually decreases, and becomes smallest at point f3 in time when Vr1=3. Then, as first discharge speed Vr1 is made substantially greater than value g3, time Tk1 gradually increases. By the way, (L3/Vr2)+(Vr2/d) is similar to (L3/Vr1)+(Vr1/d) shown in FIG. 6, and time Tk2 also has similar tendency to time Tk1.

Therefore, excessively increasing first discharge speed Vr1 and second discharge speed Vr2 increases times Tk1 and Tk2 in length. On the other hand, from the standpoint of preventing the collision between the two sheets which are being consecutively driven, increasing first and second discharge speeds Vr1 and Vr2 is advantageous.

A long sheet is later than a short sheet in the point at which sheets begin to be accelerated, and is longer in the distance it is conveyed through the Reverse conveyance passage 71. Therefore, the longer are two sheets which are being consecutively conveyed, the more likely for the two sheets to collide with each other. Therefore, the collision between the two sheets can be prevented by increasing first discharge speed Vr1, within a range in which the first driving sequence stands, that is, a range in which stop time Tr and rest time Ts can be sufficiently provided. In this embodiment, therefore, first discharge speed Vr1 is set to be faster than second discharge speed Vr2.

[Sheet Conveyance Control]

Figure 7:
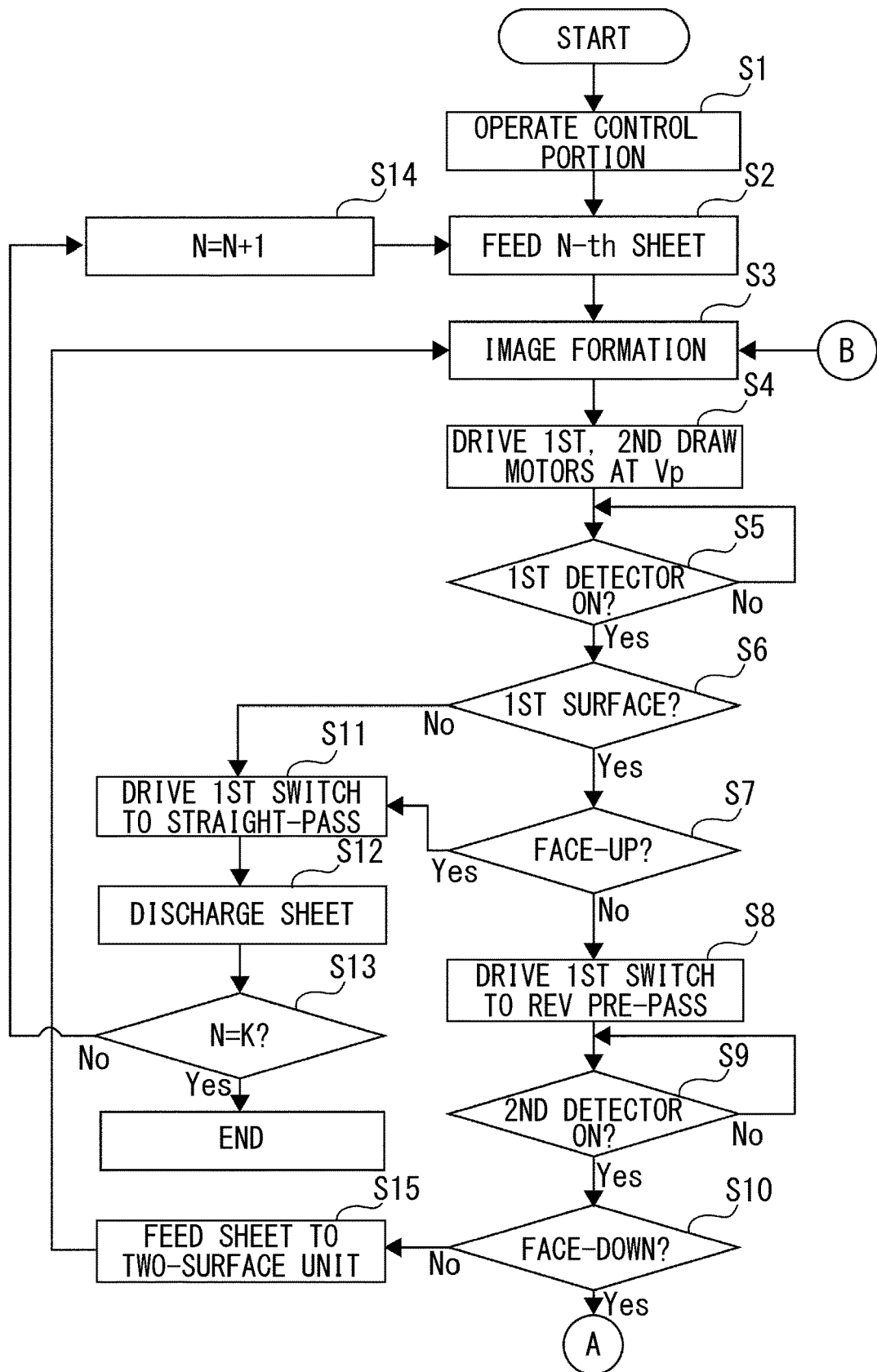
FIG. 7 is a flowchart of the sheet conveyance control.
Figure 8:
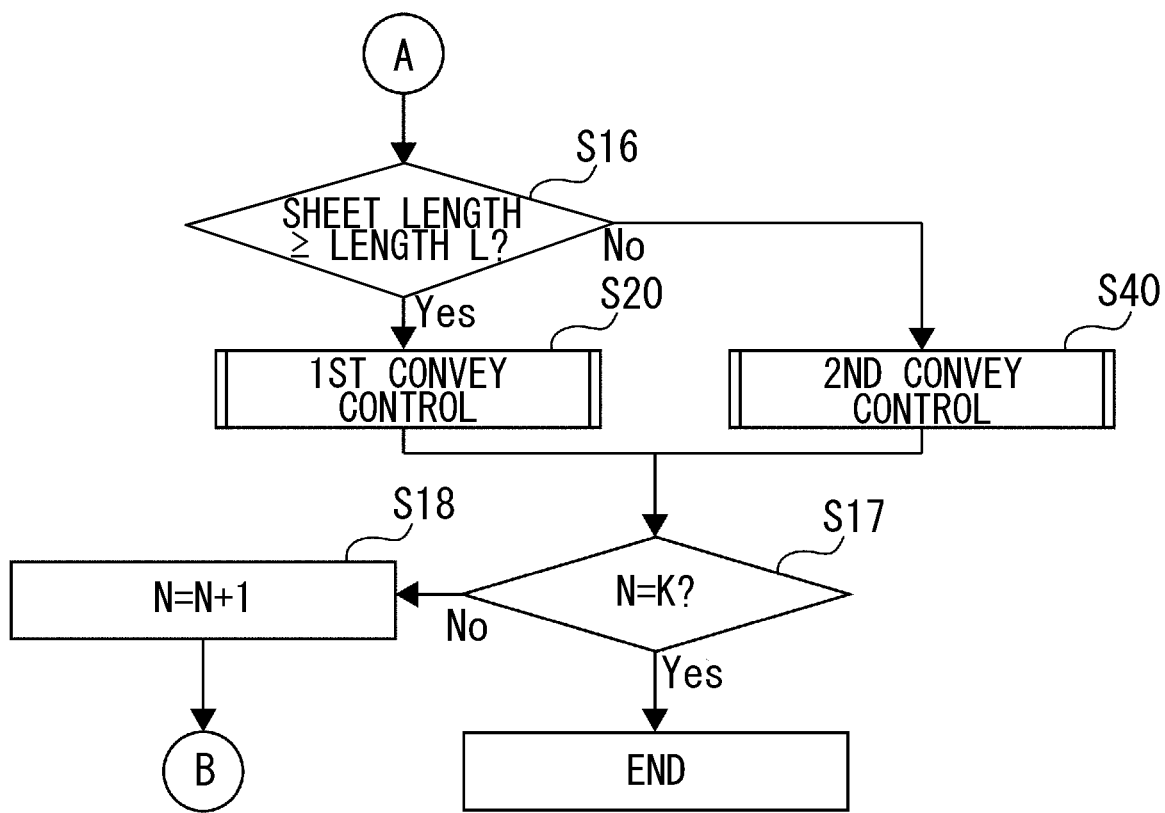
FIG. 8 is the rest of the flowchart of the sheet conveyance control shown in FIG. 7.

Next, referring to the flowcharts in FIGS. 7-10, the sheet conveyance control in a print job which is performed by the printer 1 in this embodiment is described. Referring to FIG. 7, a user inputs the basis weight and size of a sheet of recording medium, operational mode (face-up mode, face-down mode, two-sided mode, etc.), print count (K) etc., by operating the control portion 412, and makes the printer 1 start the printing job (S1). By the way, the operation to be carried out in Step S may be carried out through an external PC, a smart phone, or the like, which is in connection to the printer 1.

As the printing job is started, the N-th sheet begins to be conveyed by feeding-conveying apparatus 12 (Stop S2). By the way, in a case where the sheet which begins to be conveyed happens to be the first sheet for the printing job, the N (=1)-th sheet begins to be fed. Next, the control section 600 makes the printer 1 form an image on the first surface of the sheet with the use of the image forming section 50 (Step S3). Then, the control section 600 drives the first draw motor 231 and the second draw motor 232 at process speed Vp to rotate the first pair of draw rollers 201, pair of second draw rollers 202, and pair of second draw rollers 203 (Step 4).

Next, the control section 600 determines whether or not the sheet which is being conveyed has turned on the first detection section 221, that is, the leading edge of the sheet has arrived at the first detection section 221 (Step S5). In a case where the first detection section 221 is turned on (Yes in S5), the control section 600 determines whether or not the sheet is being conveyed for image formation on its first surface, that is, whether or not the sheet has been turned over (Step S6).

In case where it is determined that the sheet is being conveyed for forming an image on its first surface (Yes in Step S6), the control section 600 determines whether or not the current printing job is set for face-up printing (Step S7). In a case where it is set for face-up printing (Yes in Step S7), or it is determined in Step S6 that the sheet is not being conveyed for forming an image on the first surface of the sheet (No in Step S6), the control section 600 proceeds to Step S11, in which the control section 600 flips the first switching member 62 toward the straight conveyance passage 63 side in Step S11 (Step S11).

Thus, the sheet is delivered from straight conveyance passage 63 to the reverse merge passage 68, and then, is discharged into the discharge tray 500 by the pair of discharge rollers 207 (Step S12). Next, the control section 600 determines whether or not the discharged sheet (N-th sheet) is the K-th sheet, which is the last sheet for the current job (Step S13). In a case where the sheet is the K-th sheet (Yes in Step S13), the control section 600 ends the job. In a case where the sheet is not the K-th sheet (No in Step S13), the control section 600 increments N by one (Step S14), and returns to Step S2).

In a case where the job does not require face-up printing in Step S7 (No in Step S7), the control section 600 flips the first switching member 62 toward the reverse pre-conveyance passage 64 side (Step S8). Then, the control section 600 determines whether or not the sheet which is being conveyed has turn on the second detection section 222, that is, whether or not the leading edge of the sheet has reached the second detection section 222 (Step S9). In a case where the second detection section 222 has been turned on (Yes in Step S9), the control section 600 determines whether or not the current job is set to face-down printing (Step S10). In a case where the current job is a face-down printing job, the sheet is switch-backed by the pair of reverse rollers 72 to make the first surface of the sheet, on which an image has just been formed, face downward. Then, it is discharged.

In a case where the current job is not a face-down job (No in Step S10), the control section 600 conveys the sheet to two-surface conveyance unit 90 (Step S15), and returns to Step S3. That is, an image is formed on the second surface of the sheet, and then, the sheet is discharged into the discharge tray 500 after being put through Steps S3-S6, S11-S12.

In a case where the current job is set to face-down printing in Step S10 (Yes in Step S10), the control section 600 determines whether or not the sheet is greater in length than a preset length L (Step S16). In a case where it is greater than the preset length L (Yes in Step S16), the control section 600 carries out the first conveyance control as the first conveyance mode (Step S20). In a case where it is no greater than preset length L (No in Step S16), the control section 600 carries out the second conveyance control as the second conveyance mode (Step S40). In other words, in a case where a long sheet (which is greater in length than preset length L) is conveyed, the first conveyance control is carried out. In a case where a short sheet (which no greater in length than the preset length L) is conveyed, the second conveyance control is carried out. The first and second conveyance controls are described later.

As the first or second control is completed, the sheet is discharged into the discharge tray 500. As the sheet is discharged, the control section 600 determines whether or not the discharged sheet (that is, the N-th sheet) is the K-th sheet, which is the last sheet for the current job (Step S17). In a case where the sheet is the K-th sheet (Yes in Step S17), the control section 600 ends the job. In a case where it is determined that the sheet is not the K-th sheet (No in Step S17), the control section 600 increases N by 1 (Step S18), and goes back to Step S12.

[First Conveyance Control]

Figure 9:
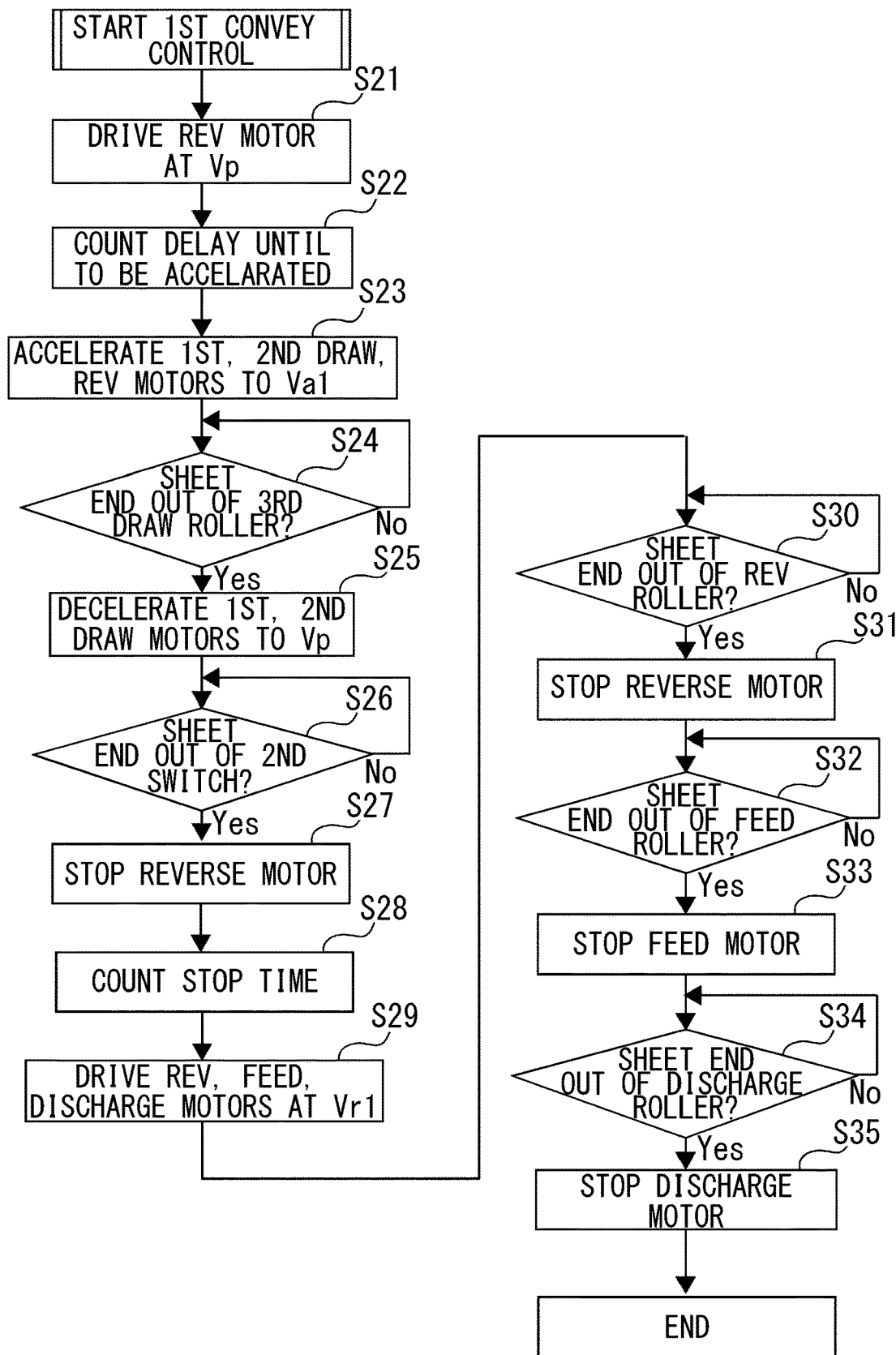
FIG. 9 is a flowchart of the first conveyance control.

Next, referring to the flowchart in FIG. 9, the first conveyance control is described. As described above, the first conveyance control is such conveyance control that is carried out by the branching conveyance unit 60 and the reverse conveyance unit 70 to control the conveyance of a long sheet, when the printer 1 is in the face-down printing mode.

Referring to FIG. 9, as the first conveyance control is started, the control section 600 begins to drive the reverse motor 234 at process speed Vp (Step S21). Then, it begins to count delay time until the timing with which a sheet is to be accelerated. As a preset length (delay) of time elapses, the control section 600 accelerates the first draw motor 231, the second draw motor 232, and the reverse motor 234 to first target speed Va1 (Steps S22 and S23). By the way, the timing with which the delay time elapses is the same as the timing with which the trailing edge of a sheet is conveyed by distance C after it comes out of the image forming section 50. By the way, distance C is optional. Steps S22 and S 23 make up the first acceleration control.

In the first conveyance control which is for conveying a long sheet, when the pair of reverse rollers 72 receive the sheet, this sheet is remaining pinched by the fixation nip 58a. Therefore, when the leading edge of the long sheet arrives at the pair of reverse rollers 72, speed Vf1 of the reverse motor 234 is equal to process speed Vp.

Next, the control section 600 determines whether or not the trailing end of the sheet has come out of the nip of the pair of third draw rollers 203 (Step S24). In a case where it is determined that the trailing edge of the sheet has come out of the nip of the pair 203 of third draw rollers (Yes in Step S24), the control section 600 decelerates the first and second draw motors 231 and 232 to process speed Vp (Step S25). The reason why the control section 600 decelerates the first and second draw motors 231 and 232 to process speed Vp is for preparing for the conveyance of the next sheet.

By the way, as soon as the trailing edge of the sheet comes out of the nip of the pair of first draw rollers 201, the control section 600 decelerates the first and second draw motors 231 and 232 to process speed Vp. Thereafter, as soon as the trailing edge of the sheet comes out of the nip of the pair of third draw rollers 203, the second draw motor 232 may be decelerated to process speed Vp.

Next, the control section 600 determines whether or not the trailing edge of the sheet has passed by the second switching member 65 (Step S26). If it is determined that the trailing edge of the sheet has passed by the second switching member 65 (Yes in Step S26), the control section 600 stops the reverse motor 234 (Step S27). The control section 600 counts stop time Tr (Step S28). As soon as stop time Tr elapses, the control section 600 begins to drive the reverse motor 234, the conveyance motor 235, and the discharge motor 237 in the reverse direction (second rotational direction) at first discharge speed Vr1 (Steps S28 and S29). The driving of the reverse motor 234, the conveyance motor 235, and the discharge motor 237 in the reverse direction (second rotational direction) causes the sheet to be conveyed toward the reverse post-conveyance passage 66 and the pair of discharge rollers 207.

By the way, Steps S27-S29 make up the first discharge control for accelerating the reverse motor 234 in the second rotational direction to first discharge speed Vr1 after the motor is temporarily stopped to switch-back the sheet.

Next, the control section 600 determines whether or not the trailing edge of the sheet has come out of the nip of pair of reverse rollers 72 (Step S30). If it is determined that the trailing edge of the sheet came out of the nip of the pair of reverse rollers 72 (Yes in Step S30), the control section 600 stops the reverse motor 234 (Step S31). Then, the control section 600 determines whether or not trailing edge of the sheet has come out of the nip of the pair of conveyance rollers 206 (Step S32). If it is determined that the trailing edge of the sheet has come out of the nip of the pair of conveyance rollers 206 (Yes in Step S32), the control section 600 stops the conveyance motor 235 (Step S33).

Thereafter, the control section 600 determines whether or not the trailing edge of the sheet has come out of the nip of the pair of discharge rollers 207 (Step S34). If it determines that the trailing edge of the sheet has come out of the nip of the pair of discharge rollers 207 (Yes in S 34), the control section 600 determines that the sheet has just been discharged into the discharge tray 500, and stops the discharge motor 237 (Step S35). That is, the first conveyance control is ended.

[Second Conveyance Control]

Figure 10:
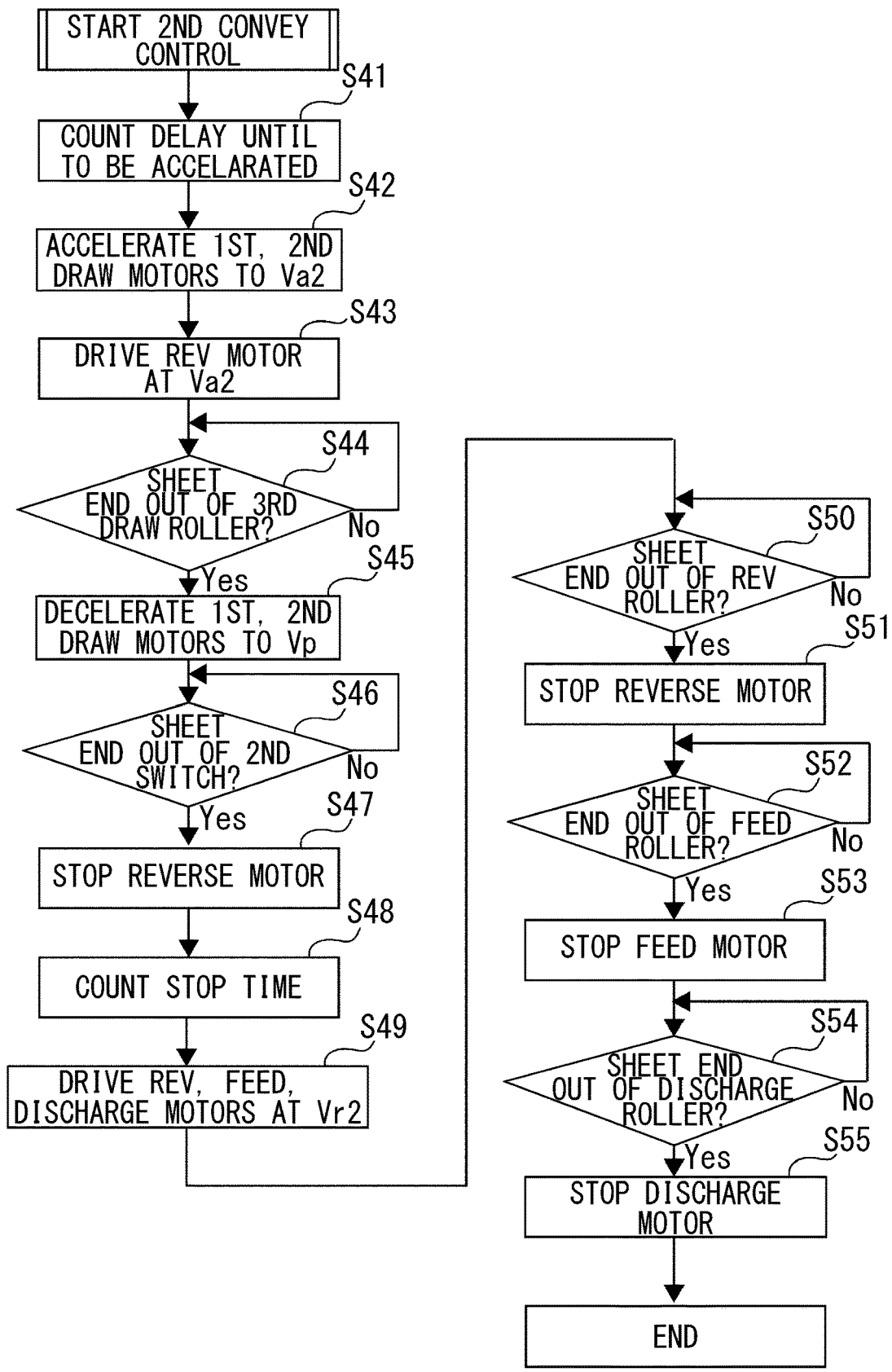
FIG. 10 is a flowchart of the second conveyance control.

Next, the second conveyance control is described, following the flowchart in FIG. 10. As described above, the second conveyance control is the conveyance control which is carried out by the branching conveyance unit 60 and the reverse conveyance unit 70 when the printer 1 is operated in the face-down mode and a short sheet is in use.

Referring to FIG. 10, as the second conveyance control is started, the control section 600 starts counting time until the delay time elapses, to determine the point in time at which the sheet needs to be accelerated (Step S41). As soon as the delay time elapses, the control section 600 accelerates first and second draw motors 231 and 232 to second target speed Va2 (Step S42). Further, it begins to drive the reverse motor 234 at second target speed Va2 (Step S43). By the way, the timing with which the delay time elapses is the same as the point in time at which the trailing edge of the sheet has just been conveyed by distance C past fixation nip 58a, that is the time with which the trailing edge of the sheet has just come out of the image forming section 50. Steps S41 and S43 make up the second acceleration control.

In the second conveyance control which is carried out when short sheets are conveyed, the trailing edge of the sheet will have moved past fixation nip 58a by the time the pair of reverse rollers 72 receive the sheet. Therefore, it is possible to set speed Vf2, at which the reverse motor 234 will begin to be driven when the leading edge of a sheet arrives at the pair of reverse rollers 72, to second target speed Va2 which is faster than process speed Vp.

By the way, the amount for distance C is optional. That is, the reverse motor 234 may be accelerated to second target speed Va2 after the elapsing of a preset length of time after the starting of the acceleration of the first draw motor 231 and the second draw motor 232 to second target speed Va2.

Hereafter, Steps S44-S48 are the same as Steps S24-S28 of the first conveyance control which was described with reference to FIG. 9. Therefore, they are not described. After the elapsing of stop time Tr in Step S48, the control section 600 drives the reverse motor 234, the conveyance motor 235 and the discharge motor 237 in reverse (second rotational direction) at second discharge speed Vr2 (Step S49). As the reverse motor 234, the conveyance motor 235, and the discharge motor 237 is driven in the reverse direction, the sheet is conveyed toward the pair of discharge rollers 207 through the reverse post-conveyance passage 66.

By the way, Steps S47-S49 make up the second discharge control for accelerating the reverse motor 234 in the second rotational direction to second discharge speed Vr2 after the reverse motor 234 is temporarily stopped to switch-back the sheet. The step S50-S49 are the same as Steps S30-S35 in the first conveyance control described with reference to FIG. 10. Therefore, they are not described.

By the say, in the foregoing description of the first embodiment, the second conveyance control was described with reference to a case where the number of sheets which are being simultaneously conveyed through the printer 1 is one. However, this embodiment is not intended to limit the present invention in scope. That is, the present invention is also compatible with a case in which two or more sheets are conveyed in succession with the provision of a preset amount of sheet intervals so that two or more sheets are simultaneously conveyed through the printer 1. In such a case, the route from Step S13 to Step S14, and the route from Step S17 to Step S18 are eliminated to enable two or more sheets to be conveyed in succession through the printer 1.

As described above, in this embodiment, the printer 1 is structured so that in a case where the printer 1 is in the face-down mode, and recording medium is a long sheet, the first conveyance control is carried out, whereas in a case where the printer 1 is in the face-down mode and recording medium is a short sheet, the second conveyance control is carried out, for the following reason. That is, in a case where the printer 1 is structured so that its reverse motor 234 can be accelerated or decelerate to increase the printer 1 in productivity, the printer is changeable in the point at which it begins to be accelerated with reference to the leading edge of the sheet, and in the likelihood with which two sheets which are being conveyed in succession collide with each other.

In this embodiment, therefore, first target speed Va1 and first discharge speed Vr1 in the first conveyance control are set so that they become faster than second target speed Va2 and second discharge speed Vr2 in the second conveyance control. Therefore, it is possible to increase the printer 1 in productivity while preventing the damage to sheets, and allowing the reverse motor to remain stationary for a sufficient length of time, regardless of sheet length.

Embodiment 2

Next, the second embodiment of the present invention is described. However, the second embodiment is virtually the same as the first one, except that in the second embodiment, the printer 1 is kept the same in the speed with which it discharges the sheet, regardless of sheet length. Therefore, the structural components of the printer 1 in this embodiment, which are similar in structure to the counterparts in the first embodiment are unillustrated or given the same referential codes, and are not described.

The length of time when the reverse motor 234 is driven in reverse has term (L3/Vr1, for example) which is inversely proportional to the length of time, and term (Vr1/d) which is proportional to the length of time. Therefore, there is a proper speed for satisfying the reverse motor 234 in the speed and the length of time it is driven. In this embodiment, therefore, the speed at which the reverse motor 234 is to be driven during the discharging of a sheet is set to third discharge speed Vr3 regardless of sheet length. The value of the third discharge speed Vr3 is the same as value g3 in FIG. 6. The length of time when the reverse motor 234 is driven in reverse during this period is length f3 of time, which is the shortest.

Figure 11:
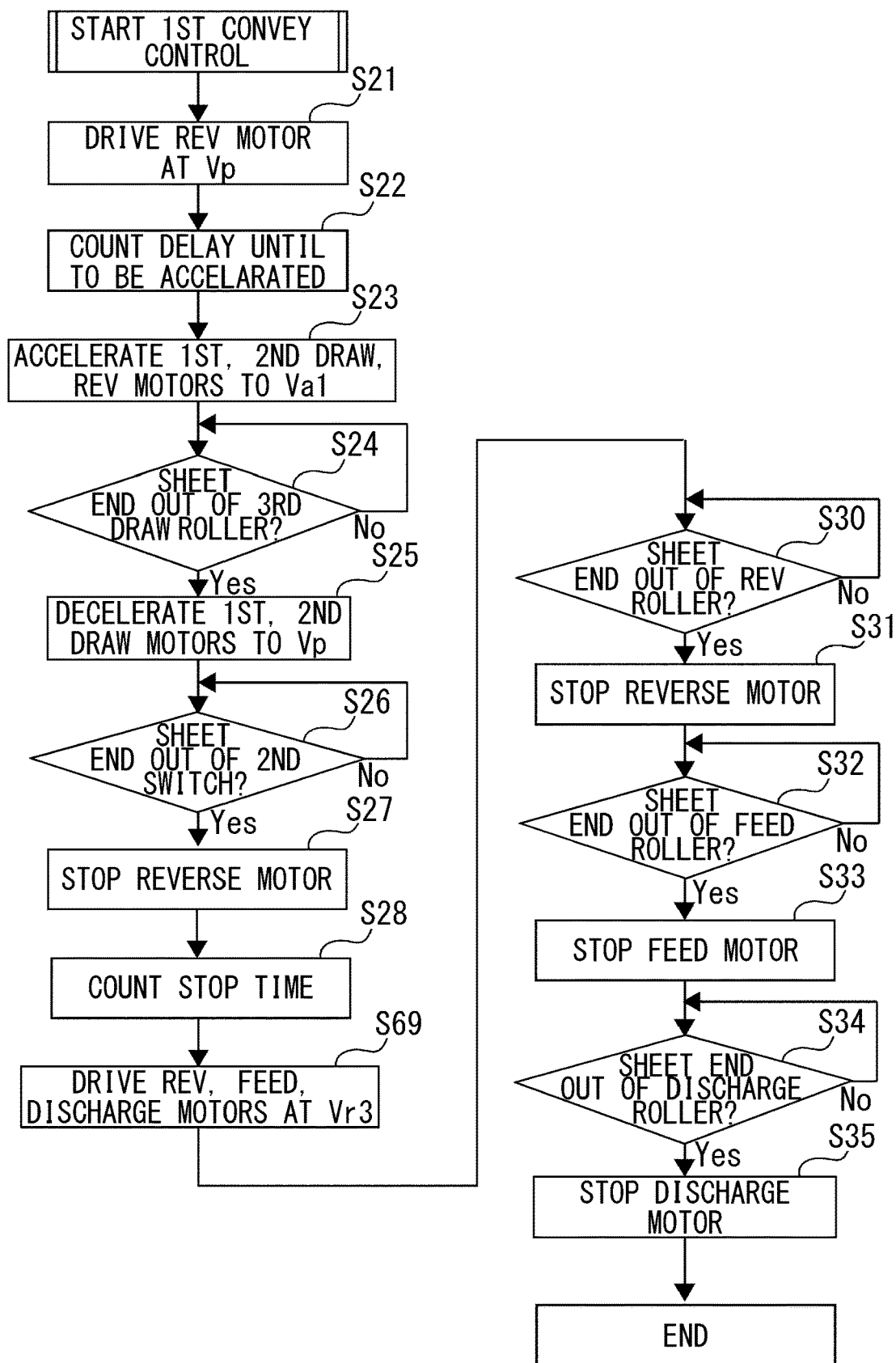
FIG. 11 is a flowchart of the first conveyance control in the second embodiment of the present invention.
Figure 12:
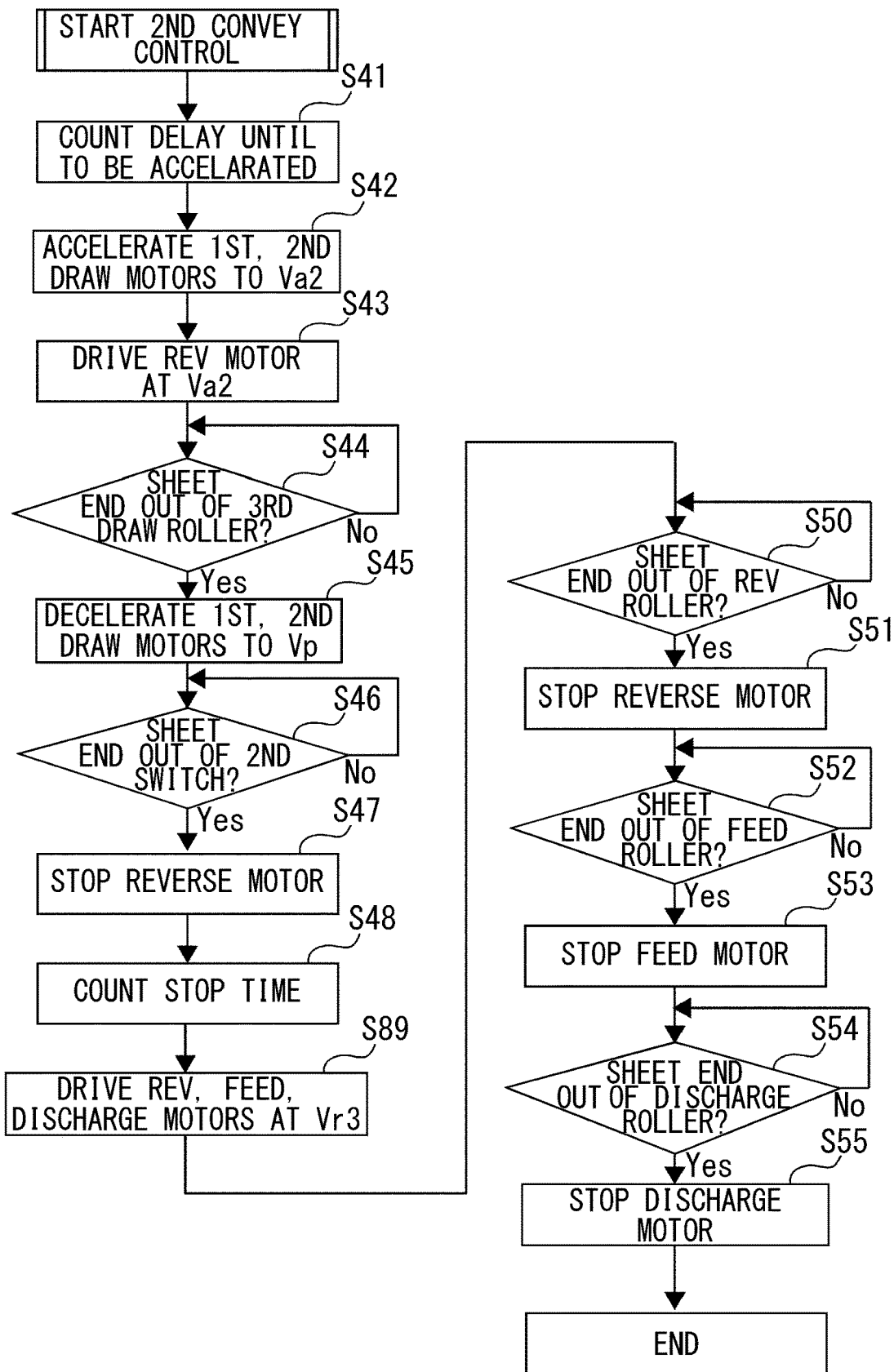
FIG. 12 is a flowchart of the second conveyance control in the second embodiment.

FIG. 11 is a flowchart of the first conveyance control in the second embodiment. FIG. 12 is a flowchart of the second conveyance control in the second embodiment. FIG. 11 is the same as the flowchart described with reference to FIG. 9, except for Step S69. FIG. 12 is the same as the flowchart described with reference to FIG. 10, except for Step S89. In Steps S69 and S89, the control section 600 drives the reverse motor 234, the conveyance motor 235, and the discharge motor 237 in the reverse direction (second rotational direction) at third discharge speed Vr3 (Steps S69 and S89).

As described above, in this embodiment, regardless of sheet length, the speed at which the reverse motor 234 is driven in reverse was set to third discharge speed Vr3. Therefore, it is possible to keep the printer 1 high in productivity while providing the printer 1 with a sufficient amount of stop time Tr and rest time Ts.

Embodiment 3

Next, the third embodiment of the present invention is described. The printer in the third embodiment is the same in structure as the printer 1 in the first embodiment, except that in the third embodiment, its image forming portion, which is similar to the one in the first embodiment, includes a cooling section 300. Therefore, the structural features of printer in this embodiment, which are the same as those of the printer in the first embodiment, are not described, or given the same referential codes as those in the first embodiment, in drawings.

In recent years, a printer has been substantially increased in productivity. Thus, it has come to occur sometimes that a toner image on a sheet of recording medium is pinched by a pair of conveyance rollers before the toner image cools down after the fixation of the toner image to the sheet by heat and pressure in the fixing section. If the toner image is pinched by the pair of conveyance rollers before the fixation of the toner image to the sheet, the toner image ends up with an impression of the nip of the pair of conveyance rollers, which is not desirable from the standpoint of print quality.

Figure 13:
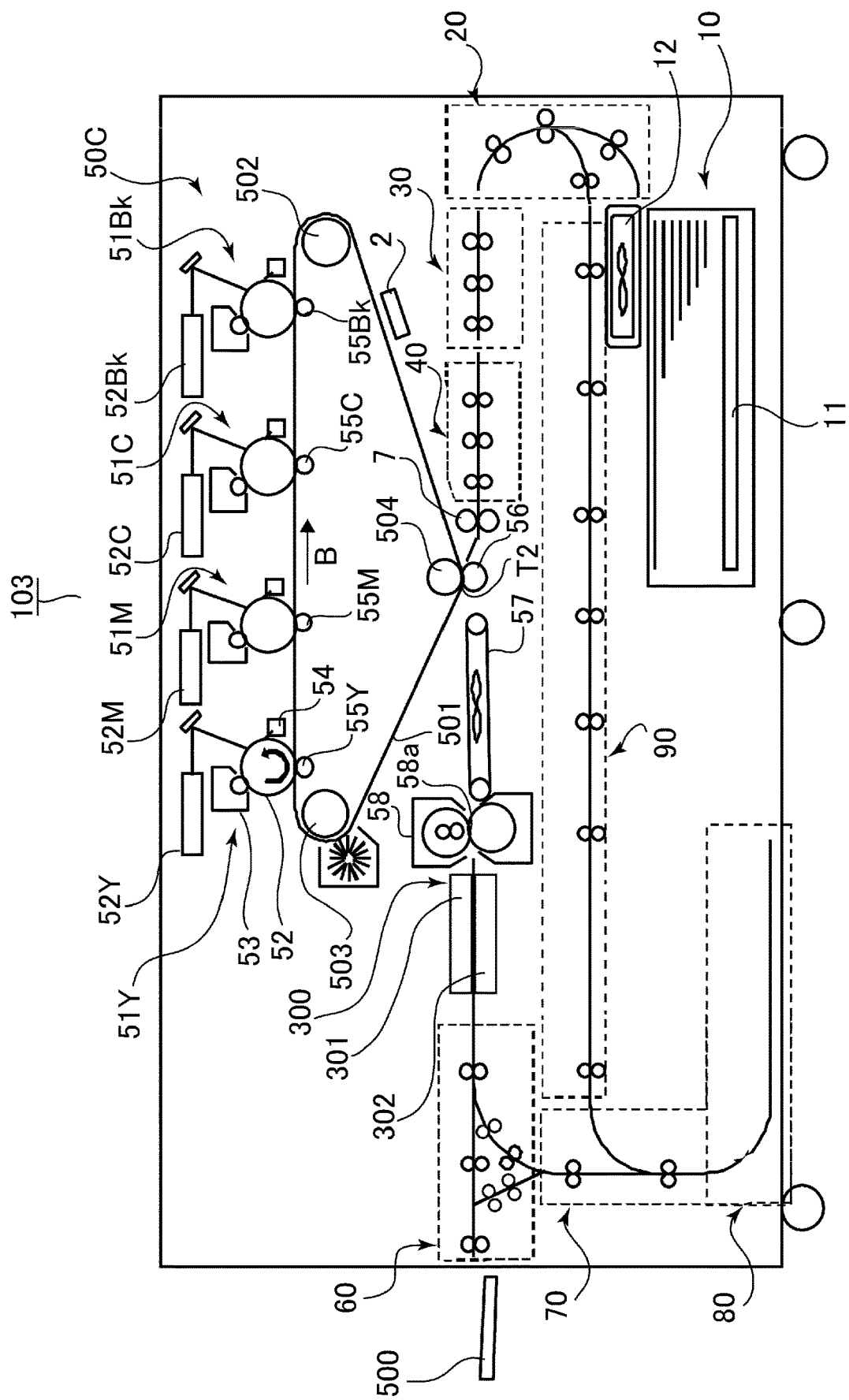
FIG. 13 is a schematic sectional drawing of the entirety of the printer in the third embodiment of the present invention.

In this embodiment, therefore, the printer 103, which is the image forming apparatus in this embodiment, is provided with such image formation unit 50C that includes cooling section 300, as shown in FIG. 13. Cooling section 300 has top and bottom belts 301 and 302 which convey the sheet. After being transferred onto the sheet in secondary transfer nip T2, and fixed by the fixing device 58, the toner image comes into contact with top belt 301. Cooling section 300 is structured so that the inward surface of top belt 301 is cooled by a heat sink. Thus, as the toner image comes into contact with top belt 301, it is efficiently cooled. By the way, cooling section 300 may be structured so that air is blown to the fins of the heat sink. Further, cooling section 300 may be structured without top belt 301. In such a case, it is structured so that as a sheet is conveyed by bottom belt 302, the top surface of the sheet is cooled by the airflow generated by a fan.

From the standpoint of the performance of cooling section 300, it is desired that the sheet is not accelerated until its trail edge comes out of cooling section 300. In this embodiment, therefore, the first draw motor 231, the second draw motor 232, and the reverse motor 234 are accelerated to first target speed Va1 or second target speed Va2 after the trailing edge of the sheet is conveyed by distance C after it comes out of cooling section 300 (FIGS. 9 and 10). The second conveyance control in this embodiment is the same as the one in the first embodiment (FIGS. 7-10), or the one in the second embodiment (FIGS. 11-12). Therefore, it is not described.

As described above, in this embodiment, image formation unit 50C, as an image forming section, has cooling section 300. Therefore, printer 3 in this embodiment can efficiently cool the toner image on the sheet, being therefore superior in image quality to those in the first and second embodiments.

[Miscellanies]

By the way, in the description of the first embodiment, the relationship among first discharge speed Vr1, second discharge speed Vr2, first target speed Va1, and second target speed Va2 are not touched. However, the relationship may be set as follows. That is, first discharge speed Vr1 and second discharge speed Vr2 may be made equal to first target speed Va1 and second target speed Va2, respectively. This arrangement makes first target speed Va1 and first discharge speed Vr1 of the reverse motor 234 the highest speed, making it possible to more efficiently use the reverse motor 234 in terms of performance. Further, it is needless to say that first discharge speed Vr1 and second discharge speed Vr2 may be different from first target speed Va1 and second target speed Va2, respectively.

Moreover, in any of the embodiments of the present invention described above, printers 1 and 103 were of the so-called electrophotographic type. These embodiments, however, are not intended to limit the present invention in scope. For example, the present invention is also compatible with an image forming apparatus of the so-called inkjet type, which form an image on a sheet of recording medium by jetting liquid ink out of a nozzle.

The present invention is also compatible with an image formation system or an image forming apparatus, which is provided with programs which enables the system or the apparatus to perform one or more of the functions of the image forming apparatuses in the embodiments described above, through a network or storage media, and has a computer having one or more processors which can read and carry out the programs. Further, the present invention is also compatible with a circuit (ASIC, for example) which can perform one or more the functions of the image forming apparatuses described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-032091 filed on Mar. 1, 2021, which is hereby incorporated by reference herein in its entirety.

What is claimed is:

1. An image forming apparatus comprising:
   an image forming portion configured to form an image on a sheet;
   a reverse roller pair provided to switch back the sheet on which the image is formed by the image forming portion, the reverse roller pair being configured to feed the sheet in a first direction and then to reverse and feed the sheet in a second direction that is opposite to the first direction;
   a reverse motor configured to rotate in a first rotational direction and cause the reverse roller pair to feed the sheet in the first direction, and to rotate in a second rotational direction opposite to the first rotational direction and cause the reverse roller pair to feed the sheet in the second direction; and
   a controller configured to control rotation of the reverse motor in a first feeding mode in which a sheet with a first length is fed and in a second feeding mode in which a sheet with a second length shorter than the first length is fed,
   wherein the controller executes a first acceleration control in which the reverse motor rotating in the first rotational direction is accelerated from a predetermined speed to a first target speed faster than the predetermined speed after a rear end of the sheet passes through the image forming portion in the first feeding mode, and the controller executes a second acceleration control in which the reverse motor rotating in the first rotational direction is accelerated to a second target speed slower than the first target speed after the rear end of the sheet passes through the image forming portion in the second feeding mode.

2. An image forming apparatus according to claim 1, wherein the predetermined speed is an image forming speed corresponding to a sheet feeding speed when the image is formed by the image forming portion.

3. An image forming apparatus according to claim 1, wherein a distance between the image forming portion and the reverse roller pair in a sheet feeding direction is shorter than the first length and longer than the second length.

4. An image forming apparatus according to claim 1, wherein the reverse roller pair is driven at the predetermined speed after a leading end of the sheet reaches the reverse roller pair in the first feeding mode, and the reverse roller pair is driven at the second target speed when the leading end of the sheet reaches the reverse roller pair in the second feeding mode.

5. An image forming apparatus according to claim 1, wherein the first and second acceleration controls are executed when the sheet is discharged in which a first surface of the sheet on which the image is formed by the image forming portion is changed from an upper surface side to a lower surface side by being switched back by the reverse roller pair.

6. An image forming apparatus according to claim 1, wherein the controller executes a first discharging control in which the reverse motor stopped once to switch back the sheet is accelerated to a first discharging speed in the second rotational direction in the first feeding mode, and the controller executes a second discharging control in which the reverse motor stopped once to switch back the sheet is accelerated to a second discharging speed slower than the first discharging speed in the second rotational direction in the second feeding mode.

7. An image forming apparatus according to claim 1, wherein the image forming portion includes a fixing portion configured to fix a toner image transferred on the sheet to the sheet at a nip portion, and wherein the controller executes the first acceleration control or the second acceleration control after the rear end of the sheet passes through the fixing portion.

8. An image forming apparatus according to claim 1, wherein the image forming portion includes a cooling portion configured to cool a toner image transferred onto the sheet, and
wherein the controller executes the first acceleration control or the second acceleration control after the rear end of the sheet passes through the cooling portion.

9. An image forming apparatus comprising:
an image forming portion configured to form an image on a sheet;
a reverse roller pair provided to switch back the sheet on which the image is formed by the image forming portion, the reverse roller pair being configured to feed the sheet in a first direction and then to reverse and feed the sheet in a second direction that is opposite to the first direction;
a reverse motor configured to rotate in a first rotational direction and cause the reverse roller pair to feed the sheet in the first direction, and to rotate in a second rotational direction opposite to the first rotational direction and cause the reverse roller pair to feed the sheet in the second direction; and
a controller configured to control rotation of the reverse motor in a first feeding mode in which a sheet with a first length is fed and in a second feeding mode in which a sheet with a second length shorter than the first length is fed,
wherein the controller executes a first acceleration control in which the reverse motor rotating in the first rotational direction is accelerated from a predetermined speed to a first target speed faster than the predetermined speed in the first feeding mode, and the controller executes a second acceleration control in which the reverse motor rotating in the first rotational direction is accelerated to a second target speed slower than the first target speed in the second feeding mode.

* * * * *